Jan. 17, 1956   G. C. HUGHES   2,731,026
FLUID PRESSURE REGULATOR
Filed July 11, 1952
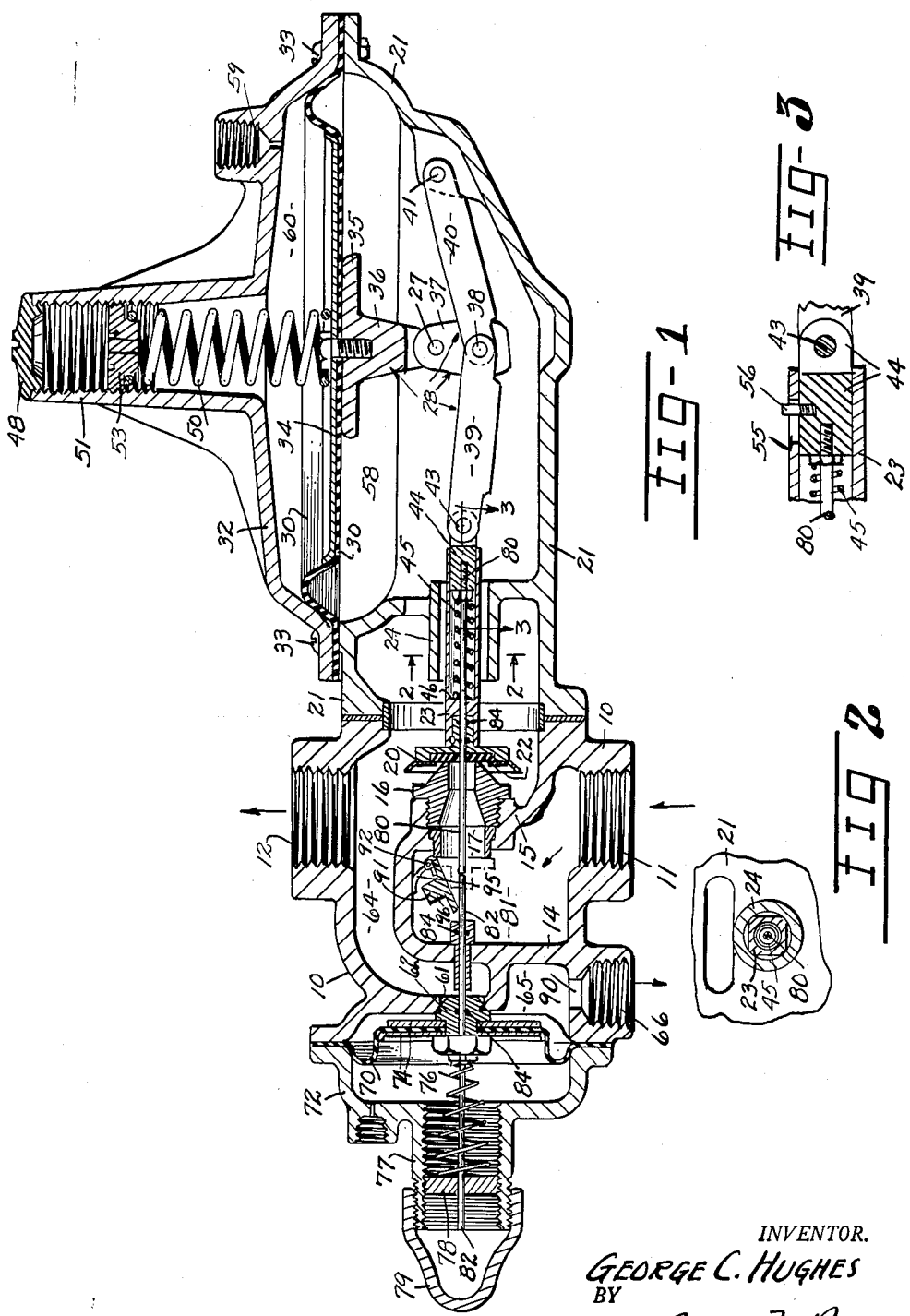
INVENTOR.
GEORGE C. HUGHES
BY
Bates, Teare, & McBean
ATTORNEYS

United States Patent Office 2,731,026
Patented Jan. 17, 1956

2,731,026

FLUID PRESSURE REGULATOR

George C. Hughes, Anderson, Ind., assignor to Reynolds Gas Regulator Company, Anderson, Ind., a corporation of Indiana Application July 11, 1952, Serial No. 298,348

15 Claims. (Cl. 137—116.5)

The present invention relates to improvements in fluid pressure regulators and especially to improvements to increase the safety of the regulator by providing it with a mechanism to automatically prevent inadvertent high pressures at the outlet side of the regulator. This therefore is the general object of the present invention.

Fluid pressure regulators of the type using a flexible pressure responsive diaphragm to actuate a valve and provide a constant low outlet pressure from a constant or fluctuating high pressure source are in general use at the present time in many gas distributing systems. At times small particles of dust, pipe scale, or the like, temporarily lodge between the valve and its seat. This temporarily prevents a complete closure or "lock-up" of the valve, and at times results in the building up of an excess pressure at the low pressure outlet side of the regulator. Many times these particles soon become dislodged whereupon the regulator again functions normally. However, before they are dislodged the pressure sometimes builds in the low pressure or service line to a point which becomes dangerous. This high outlet pressure sometimes is built up due to shock lock-up of the regulator as for instance when the flow from the high pressure supply to the low pressure outlet or service line is cut quickly. Under such conditions the regulator returns to its normal operating position following the next opening movement of the valve.

Other pressure build-ups may be caused by minor nicks in the valve seat or valve member which permit a seepage of gas through the regulator. This seepage may be ordinarily negligible, in spite of which when the regulator remains locked up for protracted periods of time even a negligible seepage may cause a dangerous build-up at the regular outlet. Under the conditions above-mentioned the regulator requires the relief of minor quantities of gas which while causing a waste of gas do not require an immediate shut down of the regulator, as the conditions which cause the excess pressure, either correct themselves, or are so minor that they may await normal inspection periods for their elimination. However, at times abnormal conditions cause the building up of excess pressure in the outlet of the regulator which requires the steady relief of great quantities of gas. Under such conditions the waste of gas not only may become serious but there is also danger of loss of pressure in the high pressure supply main.

The object of the present invention is to provide a fluid pressure regulator which will overcome the disadvantages of regulators used in the past and produce an extremely safe distributing system. More specifically it is an object of this invention to provide a gas pressure regulator which may be connected between a gas supply main and a gas service main which will automatically relieve excess outlet pressures by venting the gas from the outlet until the pressure becomes normal and then cause the regulator to return to its normal operating condition unless the gas vented exceeded a predetermined maximum rate of flow, in which case the flow of gas from the supply main to the regulator will be shut off automatically and will remain shut off until the regulator is manually serviced and reset.

Other objects and advantages of the invention will become more apparent from the following description, reference being had to one form of the invention which is illustrated in the accompanying drawings in which:

Fig. 1 is a centrally located vertical section taken through the improved regulating mechanism;

Fig. 2 is a transverse sectional detail, the plane of which is indicated by the line 2—2 on Fig. 1; and Fig. 3 is a sectional detail as indicated by the lines 3—3 on Fig. 1.

As illustrated in the drawings the improved gas pressure regulator includes a valve body 10 having an inlet opening 11 and an outlet opening 12 adapted to be connected with a high pressure supply main and a low pressure service main respectively.

The inlet and outlet openings 11 and 12 are separated by a partition wall 14 having a substantially vertically extending portion 15 in which a valve seat member 16 is removably mounted. This seat member is provided with a horizontally extending valve port opening 17. The flow of fluid through the valve port opening is controlled by a main valve member 20 which is movable in a horizontal plane to and from the outlet or right hand side of the valve seat member 16. This valve member is mounted in a diaphragm housing 21 which is secured to the valve body 10 and is in constant communication with the outlet opening 12. The valve member 20 comprises the usual valve disc 22 removably mounted on one end of a hollow valve stem 23 which is slidably mounted in a horizontally extending guideway 24 formed in the casing 21.

The valve member 20 is actuated by a flexible diaphragm 30 in response to the pressure at the outlet side of the regulator. This diaphragm extends across the open upper end of the casing 21 and is held in position thereon by a cap 32 which is secured to the casing 21 by bolts 33. The arrangement is such that the periphery of the diaphragm is clamped between the cap and the casing.

The central portion of the diaphragm 30 is clamped between a pair of rigid members 34 and 35, the latter having a depending portion 36 which is pivotally connected to one end of a link 37 as at 27. The other end of this link is connected with a common pivot pin 38 which interconnects a pair of toggle links 39 and 40. The toggle link 40 has its extreme end pivotally mounted as at 41 to the casing 21 and the toggle link 39 has its extreme end pivotally connected by a pin 43 with a plunger 44 which is mounted for axial movement in the hollow valve stem 23. A compression spring 45 is interposed between the inner end of the plunger 44 and a shoulder 46 formed in the valve stem.

The diaphragm 30 is preloaded by an adjustable spring 50 which is mounted in an upwardly extending boss 51 of the cap 32. This spring is interposed between a nut 53, threadingly mounted in the extension 51, and the upper disc 34 of the diaphragm 30 and is arranged to exert a downward pressure on the diaphragm which acts through the toggle links to move the plunger 44 and valve stem 23 to the left into a port opening position. To insure such movement the valve stem 23 may be provided with a slot 55 (Fig. 3) the ends of which are engaged by a pin 56 secured to the plunger 44. The spring 50 is adjusted by means of the nut 53 until it counter-balances the desired pressure in the outlet side of the chamber 53 below the diaphragm which, as heretofore explained, is in communication with the outlet side of the regulator. The cap 32 is provided with a vent 59 so as to insure the maintenance of atmospheric pressure in the chamber 60 above the diaphragm.

The relief mechanism which relieves excess of pressure at the outlet side of the regulator includes a valve port opening 61 formed in the wall of the valve body in axial alignment with but spaced from the valve port opening 17. The port 61 provides a passageway between the chamber 64 at the outlet side of the valve body 10 and a chamber 65 formed at the exterior of the valve body, having an exhaust opening 66 which may be vented to atmosphere by means of a suitable conduit or standpipe not shown. This chamber 65 is normally closed by a diaphragm 70 which extends across the chamber as shown in Fig. 1 and is clamped into position thereon by a hollow cap 72. The central area of the diaphragm 70, is clamped between a pair of rigid discs 74 to one of which the valve member 62 is secured. Accordingly the valve member 62 moves to and from its valve port opening 61 in response to the pressure in the chamber 65. The valve member 62 normally is retained in a port closing position by a coil spring 76 mounted in an outwardly projecting extension 77 of the cap 72. This spring is interposed between a nut 78 threadingly mounted in the cap and the outer end of the diaphragm assembly 71.

While the valve member 61 is under control of the diaphragm 70, it is also under the control of the plunger 44 which actuates the main valve member 20. As shown, a relatively narrow rod 80 is secured to the inner end of the plunger 44 and extends through the valve stem 23 and the member 20 to a point within the high pressure chamber 81 of the valve body 10. A second rod 82 is secured to the valve member 62 and extends inwardly through the chamber 64 into the high pressure chamber 81. This rod is in axial alignment with the rod 80 and has its inner end normally separated a slight distance from the end of the rod 80. Suitable packing generally indicated at 84 prevents the seepage of gas along the periphery of the rods 80 and 81 while permitting the same to move axially.

The spring 45 has sufficient strength to cause the valve member 20 to be tightly seated when the desired gas pressure is reached in the chamber 58 below the main diaphragm 30. When however such pressure exceeds the desired maximum, the diaphragm 30 will be forced upward, compressing the spring 45 and causing the rod 80 to move the rod 82 axially to the left in Fig. 1. This opens the valve 62 and positively vents the outlet chamber 64 through the chamber 65 and the exhaust port 66. Should the pressure below the main diaphragm 30 return to normal the diaphragm 30 will lower permitting the springs 45 and 76 to return their respective plungers to their normal operating positions. Accordingly the regulator will be automatically returned to its normal operating condition when the excess pressure in the exhaust side of the regulator has been relieved.

The exhaust orifice 66 from the chamber 65 is as shown in Fig. 1 as having a restricted portion 90. This limits the rate of flow of gas through the orifice 90 at the relief pressure. Should a greater flow of gas be vented than will pass freely through the restricted orifice 90 at the relief pressure, the pressure in the chamber 65 below the supplemental diaphragm 70 will build up causing further opening of the valve member 62 permitting a greater quantity of gas to be vented from the main regulator. However, when a predetermined maximum pressure builds in a chamber 65 it causes the diaphragm 70 to draw the rod 82 away from the rod 81 permitting a supplemental valve member 91 to coact with the left hand face of the valve port member 16 and stop the flow of gas from the high pressure inlet to the chambers 58 and 64. The valve member 91 is pivotally connected as at 92 with the left hand end of the valve seat member 16 and is normally held in its open position shown in Fig. 1 by the rod 82. When however this rod is withdrawn from beneath the valve member the latter will be forced by a suitable spring 95 into position to close the inner end of the valve seat member 16 thus preventing further flow of gas to the main regulator. This valve member is so arranged that it will be held seated both by its spring 95 and by the pressure of the gas in the high pressure inlet chamber 81 of the valve body.

The supplemental valve member 91 is provided with an extension 96 which, when the valve member is in its closed position as indicated in dot-and-dash lines in Fig. 1, will serve to prevent the rod 82 from returning to its normal position. This serves to maintain the valve 62 open thus venting the regulator despite the reduction of pressures in the chambers 58 and 64 due to the closing of the valve 91.

A typical operation of the improved regulating device is as follows: Gas flows through the inlet 11 in the direction of the arrow through the valve port 17 into the chambers 58, 64 and the outlet opening 12. The position of the valve 20 is controlled by the pressure in the chamber 58 so that the pressure in the outlet 12 will remain constant. This pressure may be regulated by adjustment of the spring 50 in the usual manner. Any undesirable build-up of pressure in the chamber 58 will cause the diaphragm operated toggle mechanism to exert its maximum force against the valve member 20 to close the valve port 17. This maximum force is a preset figure known as the point of relief and may be set where desired, as for instance eight ounces, twelve ounces, or sixteen ounces by proper choice of the spring 45.

For an example of the operation of the improved regulator, we may assume that the point of relief is fixed at eight ounces by the spring 45 and that the regulator spring 50 is set to give a desired outlet pressure of six inches of water column while gas is flowing and six and seven-tenths inches of water column or four ounces of pressure at no flow. Under these conditions an increase of pressure in the chamber 58 to the eight ounce point of relief, causes the force of the spring 50, in a downward direction to be over-balanced by a two ounce increased pressure on the main diaphragm 30 in an upward direction which is equal to a force of three and one-half pounds. This differential through the toggle mechanism 28 is increased six times or to twenty-one pounds. This total power of twenty-one pounds compresses the spring 45 moving the rod 80 to exact contact with the rod 82. Any further increase of pressure in the chamber 58 will cause the rod 80 to move the rod 82 and open the relief valve 62, thereby allowing the pressure in excess of eight ounces to escape to atmosphere through the port 90 and the exhaust passageway 66.

The presence of pressure in the chamber 65 acts on the diaphragm 70 and has only to overcome the force of the spring 76, which is relatively light as its only use is to seal the valve 62 against the eight ounce pressure, therefore a small force on the diaphragm 70, which has a much greater area than the valve 62, will open the valve 62 further.

The arrangement of the spring 76 and diaphragm 70 is such that as long as the gas flowing through the relief mechanism is less than two hundred feet a minute the diaphragm 70 will permit the rod 82 to remain beneath the shut-off valve 91. Accordingly should the cause of the build-up in the chamber 58 rectify itself, the valve 96 will close and the regulator will continue to perform its normal function without interruption. However, should the flow through the restricted relief valve port 90 exceed the fixed quantity, that may pass freely therethrough, namely two hundred cubic feet a minute, the pressure in the chamber 65 will build up and the rod 82 will be withdrawn from its supporting relation with the shut-off valve 91.

Should the pressure in the chamber 58 increase to over eight ounces, the pressure in the chamber 65 builds up, as heretofore mentioned. At the same time the diaphragm 30 rises to a point which draws the toggle pivot 38 upward above a line passing through the toggle pivots 43 and 41. This withdraws the plunger 44 and the associated rod 80 until the left hand end of the rod lies within the valve seat member 16. This locks the toggle in such position. At the same time pressure on the diaphragm 70 withdraws the rod 82 from beneath the shut-off valve 91. This valve 91 will then close against the mating face of the valve seat member 16, both due to the force of its spring 95 and the force of the inlet pressure in the chamber 81, thereby shutting off all flow of gas from the inlet to the downstream or exhaust side of the regulator.

The shutting off of the pressure from the chamber 81 to the chamber 58 stops the flow of gas into such chamber whereupon the pressure in that chamber is rapidly relieved. Such relief reduces the pressure in the chamber 65, to the right of the diaphragm 70, whereupon the spring 76 acts to urge the relief valve 62 to a port-closing position. However, the rod 82 will contact the boss 96 on the shut-off valve 91 while the relief valve 62 is still open. This keeps the relief valve open to permit escape of any gas which might seep past the valve 96 and prevents the building up of any pressure in the chamber 58.

When the shut-off valve 91 has closed it must be manually re-set before the regulator again will operate normally. To place the regulator in service following the seating of shut-off valve 91, the casing 21 and cap 79 are removed from the valve body 10. The valve 91 is pushed to an open position and the diaphragm 70 and rod 81 are returned into position thereby locking the shut-off valve 96 open. The cap 48 of the main regulating casing 21 is then removed and the main diaphragm pushed to reposition the toggle pivot 38 below the center of the pivots 43 and 41 whereupon the regulator casing 21 is again secured to the valve body 10, the caps 79 and 48 repositioned and seated in place whereupon the regulator is in condition to resume its normal operation.

I claim:

1. In a fluid pressure regulator having an inlet and an outlet, a valve member to control the flow of fluid between said inlet and outlet, means responsive to the pressure at the outlet to actuate said valve member, a pressure relief mechanism comprising a normally closed exhaust port, relief means responsive to an excess fluid pressure at the regulator outlet to relieve said excess pressure by permitting fluid to flow from the regulator outlet through the exhaust port, and shut-off means including a second valve member to control the flow of fluid between the inlet and outlet, means biasing said second valve member toward a closed position, means normally acting to retain said second valve member open, and means responsive to pressures of the exhausting fluid above a predetermined maximum to render said normally acting means inactive to permit said biasing means to move said second valve to a closed position and stop the flow of fluid between the regulator inlet and outlet when the flow of exhausting fluid rises above said predetermined maximum.

2. A fluid pressure regulator having an inlet and an outlet, a valve member to control the flow of fluid between the inlet and outlet and means responsive to the fluid pressure at the regulator outlet to actuate said valve member, a pressure relief mechanism comprising a normally closed fluid exhaust port, relief means responsive to an excess fluid pressure in the regulator outlet to relieve such excess pressure by permitting the flow of fluid from the outlet through the exhaust port, said means being automatically resettable consequent upon the return of pressure at the regulator outlet to normal, said means including a chamber into which fluid flowing through the exhaust port discharges, a flexible diaphragm forming one wall of said chamber, said chamber having a restricted discharge port, biasing means for said diaphragm, and means rendered active by a predetermined movement of said diaphragm in response to pressure in said chamber and coacting with said relief means to prevent automatic resetting of said relief means.

3. A fluid pressure regulator having an inlet and an outlet, a valve member to control the flow of fluid between the inlet and outlet, means responsive to the fluid pressure at the regulator outlet to actuate said valve member, a normally closed fluid exhaust port, relief means responsive to an excess fluid pressure at the regulator outlet to relieve such excess pressure by permitting the flow of fluid from the outlet through the exhaust port, said means being automatically resettable consequent upon the return of pressure at the regulator outlet to normal, and means coacting with said relief means and responsive to the rate of flow of fluid through the exhaust port to prevent automatic resetting of said last named means when the flow of fluid through the exhaust port exceeds a predetermined volume.

4. In a fluid pressure regulator having an inlet and an outlet, a valve to control the flow of fluid between the inlet and outlet, means responsive to the pressure at the outlet to actuate said valve, a pressure relief mechanism comprising a normally closed exhaust port, relief means responsive to an excess pressure in the regulator outlet to relieve such excess pressure by permitting fluid to flow from the outlet of the regulator through said exhaust port, and means responsive to the exhausting fluid to stop the flow of fluid between the regulator inlet and outlet when the flow of exhausting fluid reaches a predetermined maximum, said last-named means including a chamber into which fluid from the exhaust port discharges, said chamber having a restricted discharge opening, a flexible diaphragm forming one wall of said chamber, a shut-off member to stop the flow of fluid between the inlet and outlet, and means connected with said diaphragm to control the position of said shut-off member.

5. In a gas pressure regulator having an inlet and an outlet, a valve to control the flow of fluid between the inlet and outlet and means responsive to the pressure at the outlet to actuate said valve, a pressure relief mechanism including a normally closed exhaust port, relief means responsive to an excess pressure in the regulator outlet to relieve such pressure by permitting gas to flow from the outlet of the regulator through said exhaust port, shut-off means responsive to the rate of flow of the gas flowing through said exhaust port to stop the flow of gas between the regulator inlet and outlet when the rate of flow of gas through said exhaust port reaches a predetermined maximum and means under control of said last-named means to retain said shut-off means active to prevent flow of gas through said exhaust port should the outlet pressure drop to normal.

6. In a gas pressure regulator, a valve body having a gas inlet and a gas outlet separated by a partition wall having a valve port extending therethrough and axially aligned valve seat on opposite sides of said port, a valve member mounted for each seat, said members being mounted for movement to and from their respective seats to close said port, a flexible diaphragm responsive to pressure at the outlet side of said regulator, an operative connection between said diaphragm and one of said valve members to control the movement of such valve member in response to the outlet pressure of the regulator, a second diaphragm, a latch mechanism connected with said second diaphragm and normally holding said other valve member in an open position, said diaphragm being responsive to a predetermined pressure to release said latch.

7. In a gas pressure regulator, a valve body having an inlet and an outlet separated by a partition wall provided with a passageway extending therethrough and providing a valve port, a pair of valve members, one valve member being positioned at each side of said port and being movable to and from such port, one of said valve members having a hollow valve stem secured thereto and extending axially relative to said valve port, a plunger axially movable in said stem, resilient means positioned between said stem and plunger, a flexible diaphragm responsive to pressure at the outlet side of said valve mechanism interconnected between said diaphragm and said plunger to move the plunger to and from the valve port, a rod mounted in said plunger and extending through said valve stem, said valve member and said port, said rod being in axial alignment with said port, a second flexible diaphragm mounted for movement in a direction normal to the axis of said rod, said diaphragm being separated from the inlet and outlet by a partition wall having a port extending therethrough, a third valve member carried by said second diaphragm to open and close said last named port said last named valve being in axial alignment with said rod, a second rod secured to said last named valve member and extending axially toward said first named rod, said other valve being normally supported in an open position by second named rod wherein an excess pressure against said last named diaphragm acts to withdraw said rod from supporting engagement with said last mentioned valve, and resilient means to close such valve.

8. In a gas pressure regulator, a valve body having an inlet and an outlet separated by a partition having a valve port opening extending therethrough, a valve seat at one end of said port, a valve movable to and from said seat to control the flow of fluid from the inlet to the outlet, a flexible diaphragm responsive to pressure at the outlet side of the regulator, an operating connection between said diaphragm and said valve including a compressible member through which the valve closing movement of the diaphragm is transmitted to such valve, a plunger extending through said valve and having a direct operating connection with the diaphragm whereby a rise in outlet pressure following the closing of the valve will cause the diaphragm to move the plunger relative to such valve, said body having an exhaust port in communication with the outlet but separated from the inlet by said partition wall, a valve movable to and from said last named port, resilient means biasing said last named valve to a closed position, a valve stem secured to said last named valve and arranged to abut said plunger when the first named valve is closed, whereby continued movement of said plunger after the first valve is closed will open the second named valve and relieve the pressure at the outlet side of the regulator, a chamber into which the exhaust discharges, a restricted discharge opening for said chamber, a pressure responsive member forming one wall of said chamber, an operating connection between said member and the second named valve whereby a predetermined increase of pressure in said chamber will cause said member to increase the opening movement of the last named valve.

9. A regulator according to claim 8 wherein there is a valve seat at the other end of said first named port, a valve mounted for movement to and from such seat to control the passage of fluid through said first named port, means biasing said last named valve toward a port closing position, said valve stem projecting into the closing path of said last named valve and normally acting to retain it open, said stem having a length to permit a predetermined valve opening movement of the associated diaphragm, while retaining the last named valve open and to be withdrawn from the path of the last named valve following a movement in excess thereof to permit said biasing means to close the last named valve.

10. A regulator according to claim 9 wherein said last named valve when closed coacts with said valve stem to retain the second named valve open regardless of any further change of pressures in the regulator.

11. In a gas pressure regulator a valve body having an inlet and an outlet separated by a partition having a valve port opening extending therethrough, a valve seat at each end of said port, valves movable to and from respective seats each valve being arranged to control the flow of fluid from the inlet to the outlet independent of the other, a flexible diaphragm responsive to pressure at the outlet side of the regulator, pressure biasing means for said diaphragm, an operating connection between said diaphragm and one of said valves and including an extensible member, resilient means tending to retain said member extended and through which the movement of the diaphragm is transmitted to close such valve, a plunger extending through the last mentioned valve and having a direct operating connection with the diaphragm whereby a rise in outlet pressure following the closing of the valve will cause the diaphragm to move the plunger relative to such valve, means biasing said other of said valves toward its seat, said body having an exhaust port axially aligned with the first named port and in communication with the outlet but separated from the inlet by said partition, a third valve movable to and from said exhaust port to control the flow of fluid therethrough, resilient means biasing said third valve toward a closed position, a valve stem secured to said third valve and axially aligned with said plunger whereby continued movement of said plunger after the first named valve is closed will open the third named valve and relieve the pressure at the outlet side of the regulator, and means including said valve stem to control the position of such other valve.

12. A regulator according to claim 11 wherein said body has a chamber into which the exhaust port discharges, a restricted discharge opening for said chamber, a pressure responsive diaphragm forming one wall of said chamber and carrying the third valve whereby a predetermined increase of pressure in said chamber will cause said last named diaphragm to increase the opening movement of the last named valve member.

13. A regulator according to claim 11 wherein said valve stem projects into the closing path of said other valve and normally acts to retain it open, said stem being of a length to permit a predetermined valve opening movement of the associated diaphragm while retaining said other valve open and to be withdrawn therefrom following a movement in excess thereof to permit closing of said other valve.

14. In a gas pressure regulating and shut-off valve, a valve body having an inlet adapted to be connected with a gas pressure main, an exhaust leading to atmosphere and an outlet adapted to be connected with a gas service line, a partition wall separating the inlet, exhaust and outlet from each other, said partition having one valve port providing a communication for the flow of gas from the inlet to the outlet and a second valve port providing for the flow of gas from the outlet to the exhaust, a valve coacting with respective valve ports to control the flow of gas therethrough, means responsive to the gas pressure at the outlet to control the valve member coacting with the first port, means biasing the valve member for the second named port to a closed position, means controlled by said first named means to open the biased valve member in response to an excess gas pressure at the outlet, third valve to control the flow of gas through the first named port independent of the first valve, means biasing said last named valve toward a port closing position, means normally acting to retain said last named valve member open, and means responsive to the pressure of the gas flowing through the second named port to render said last named means inactive when such pressure exceeds a predetermined maximum.

15. In a gas pressure regulator a valve body having an inlet for connection with a gas pressure main, an outlet for connection with a gas service main, a discharge opening communicating with atmosphere, a regulating valve to control the flow of gas from the inlet to the outlet, pressure responsive means responsive to the outlet pressure to control the position of the regulating valve, a relief valve to control the flow of gas from the outlet to the discharge, operating means interconnecting the pressure responsive member with the relief valve to control the initial opening thereof, pressure responsive means responsive to the pressure of the gas flowing between the outlet and the exhaust to control the movement of the relief valve following its initial opening, a shut-off valve to control the flow of gas from the inlet to the outlet independent of the control exercised by the regulating valve, and an operating connection between the shut-off valve and the relief valve to control the position of the shut-off valve.

References Cited in the file of this patent

UNITED STATES PATENTS

| | | |
|---|---|---|
| 1,000,799 | Grimes | Aug. 15, 1911 |
| 1,145,601 | Lemoine | July 6, 1915 |
| 1,611,079 | Rosehanek | Dec. 14, 1926 |
| 2,147,850 | MacLean | Feb. 21, 1939 |
| 2,217,880 | Woodson | Oct. 15, 1940 |
| 2,327,055 | McMahon | Aug. 17, 1943 |
| 2,370,110 | Spence | Feb. 20, 1945 |
| 2,581,071 | Born | Jan. 1, 1952 |
| 2,664,672 | Ey | Jan. 5, 1954 |